Patented June 18, 1940

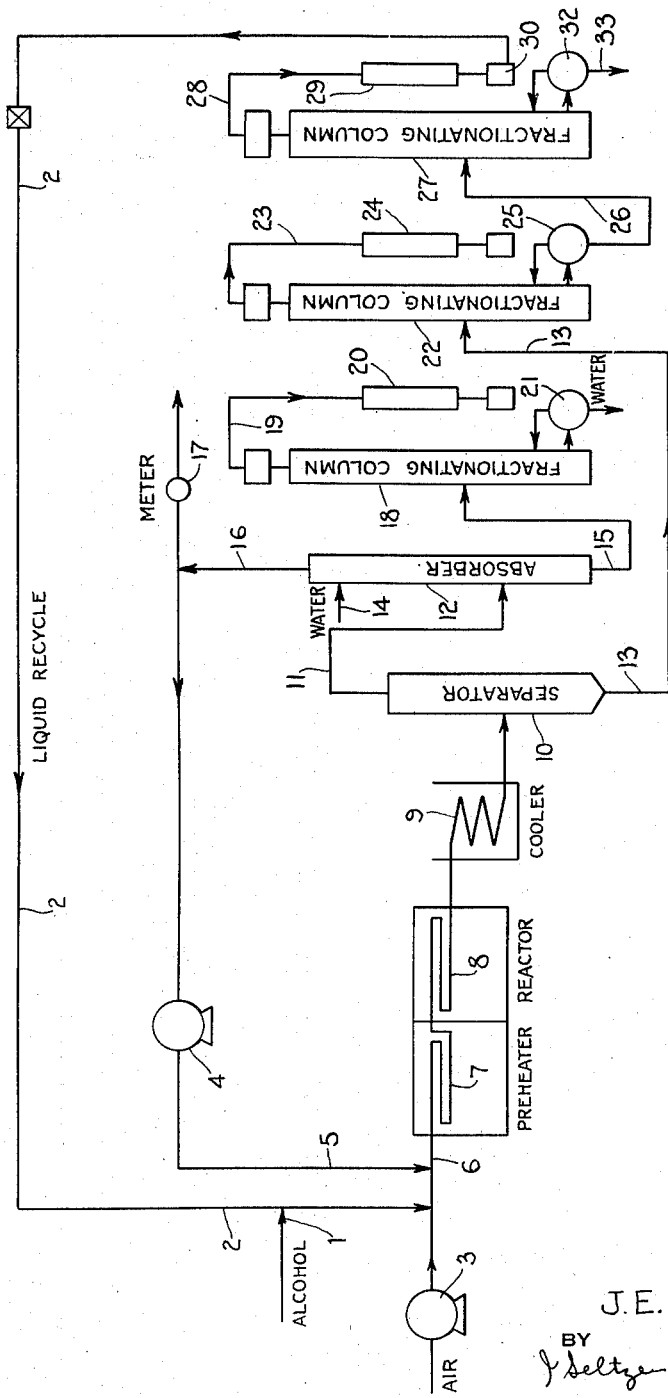

2,204,652

UNITED STATES PATENT OFFICE 2,204,652

ALCOHOL OXIDATION

Joseph E. Bludworth, Cumberland, Md., assignor to Celanese Corporation of America, a corporation of Delaware Application March 11, 1939, Serial No. 261,235

15 Claims. (Cl. 260—603)

This invention relates to the oxidation of ethyl alcohol or other alcohols, and relates more particularly to the oxidation of such alcohols by means of air or other oxygen containing gas.

An object of my invention is to oxidize alcohols in an economical and expeditious manner whereby better yields of desired products are obtained. Other objects of my invention will appear from the following detailed description.

Reference is had to the accompanying drawing in which there is made a diagrammatic showing of apparatus for carrying out one mode of my invention.

While the oxidation of ethyl alcohol by means of air to form acetaldehyde have been heretofore proposed, the prior methods produce rather poor yields for each pass through the oxidation zone and cause the formation of large quantities of decomposition products such as carbon monoxide and carbon dioxide with the result that rather low over-all yields are obtained.

I have found that the oxidation of ethyl alcohol or other alcohol while in the vapor phase can be caused to proceed more smoothly and controllably, with greatly increased yields both after one passage through the reaction zone and in over-all recovery, if the oxidation is caused to proceed under conditions whereby the heat of reaction is dissipated and/or absorbed to prevent too large increases of temperature and when higher reaction temperatures prevail, the time to which the products are exposed in such temperatures is greatly reduced.

By my invention yields of acetaldehyde as high as 33 to 55% can be obtained by subjecting the ethyl alcohol to one step of oxidation, while over-all yields of 95 to 98% may be obtained by repeatedly subjecting the unconverted alcohol to further oxidaton reactions.

To obtain the rapid dissipation of heat one or both of the following expedients are employed (1) the reactants are admixed with an inert gas or diluent such as nitrogen, which may be conveniently introduced as a recycle of part of the gases of reaction after the condensible liquid has been removed therefrom in part or in whole, and (2) the reaction mixture is caused to pass through the reaction zone at high linear velocities.

The amount of inert gas employed may be varied in accordance with the other conditions prevailing, but generally I have found that good results are obtained when the volume of inert gas recycled is from 1 to 15 or more times the combined volume of the alcohol vapors and air present in the reaction. The presence of this recycled gas is advantageous, because by its bulk it increases the velocity of the reacting gases, it tends to spread the reactants over a greater amount of surface, thereby aiding in the dissipation of heat, it aids in evenly distributing or mixing the reactants, and it absorbs considerable heat that is developed in the reaction as sensible heat and thereby helps to reduce the final temperature.

As to the linear velocity of the reactant through the reaction zone, I prefer this to be high, on the order of 25 to 100 feet and up to 200 feet or more per second, depending on the cross-sectional area of the reaction zone, the greater such area the greater speed required. The high velocity insures the rapid removal of the desired product from the reaction zone before secondary reaction sets in, and also produces a high degree of turbulence which eliminates localized heating, increases heat transfer by decreasing film thickness and constantly redistributes the reactants to such a degree that the reaction follows an arrangement that can be predetermined.

The time the reactants are subjected to the temperatures of the reaction zone are short, say on the order of $\frac{1}{20}$ to $\frac{3}{4}$ second, preferably $\frac{1}{10}$ to $\frac{1}{2}$ second.

While this invention is particularly useful in connection with the oxidation of ethyl alcohol, it may be used for the oxidation of other alcohols such as methyl alcohol, propyl alcohol or butyl alcohol.

While I prefer to employ air as the oxidizing agent, free oxygen or any suitable gas containing free oxygen may be employed. The amount of oxygen present is preferably not sufficient to oxidize all the alcohol present, but is preferably from 15 to 60% of the theoretical amount required.

As to the temperature of the reaction, this may be up to 900° F. and is preferably from 750° to 825° F. To attain this temperature, the reactants may be preheated to 240° to 450° F. or more.

The reaction chamber is preferably made of material that has high conductivity for heat so as to dissipate the exothermic heat of reaction as rapidly as possible. Examples of suitable material are copper and silver, but metals of lower heat conductivity such as iron may be used if provision is made for increasing surface to meet the lower conductivity. The reaction chamber may be in the form of tubes or pipes.

I have found that the use of oxidation catalysts does not help in increasing the yields and in some cases do not produce yields as good as those obtained by my invention without the use of catalyst, and therefore I prefer to omit catalysts but their use is not precluded.

While I prefer to carry out the reaction at atmospheric pressures, sub-atmospheric pressures or super-atmospheric pressure up to 60 lbs. per square inch may be used.

As the oxidation of the ethyl alcohol is not complete in one passage through the reaction zone, the unconverted alcohol is recovered from the reaction product and reused in the process.

Besides acetaldehyde, a small amount of acetic acid is formed, and this may be separated in any known manner.

In order further to illustrate my invention, but without being limited thereto, the following specific example is given.

Example

Ethyl alcohol is introduced at the rate of 0.121 lb. per minute of which 0.043 lb. of fresh alcohol per minute are introduced by means of pipe 1, the remaining being returned as recycle by pipe 2. Air is introduced at the rate of 0.88 cubic foot (0.067 lb.) per minute by means of blower 3, and recycle gas consisting essentially of nitrogen and containing small quantities of free oxygen, carbon dioxide and carbon monoxide are introduced at the rate of 1.76 cu. ft. per minute by blower 4 and pipe 5. The resulting mixture is led by pipe 6 to preheater 7 comprising a single tubular continuous iron coil ¾ inch in diameter and 27 feet in length.

The mixture is preheated in the preheater so that its exit temperature is 400° F. and then passes through the reactor 8 which may be made of copper or iron. This reactor comprises a coil that is ¾ inch in diameter and 37 feet in length. The mixture of gas and vapors pass through the reactor at a linear velocity of 40 feet per second. A maximum temperature of 815° F. is attained in reactor 8.

The mixture leaving the reactor 8 is led through the cooler 9 to the separator 10. From the top of the separator 10, the aldehyde vapors and uncondensed gases are led by pipe 11 to the absorber 12, while the liquid mixture consisting of aldehyde, unconverted alcohol, water and some acetic acid, is removed from the bottom of separator 10 by pipe 13.

In the absorber 12, the gases and vapors are scrubbed by water introduced by pipe 14 to absorb the acetaldehyde, the mixture of acetaldehyde and water being withdrawn by pipe 15, while the unabsorbed gas leaves by pipe 16, part of the gases being recycled by blower 4, the remainder being vented through the meter 17 to the air.

The mixture of water and acetaldehyde from pipe 15 is led to the fractionating column 18 from which the acetaldehyde vapors are led by pipe 19 to condenser 20. The water is withdrawn from the reboiler 21. This water may contain alcohol which may be separated therefrom by a fractionating column (not shown) and returned to the process by recycle line 2.

The liquid mixture from the separator 10 is led by pipe 13 to fractionating column 22 from which acetaldehyde vapors leave by pipe 23 to condenser 24, the liquid from the reboiler 25 is conducted by pipe 26 to the fractionating column 27, the alcohol vapors passing through the pipe 28 to condenser to storage tank 30, while the water, which contains some acetic acid is withdrawn from reboiler 32 by pipe 33, from which it is led to apparatus for the separation of the acetic acid.

The yields of acetaldehyde are 0.0415 lb. per minute and of acetic acid 0.0063 lb. per minute.

It is to be understood that the foregoing detailed description is given merely by way of illustration and that many variations may be made therein without departing from the spirit of my invention.

Having described my invention, what I desire to secure by Letters Patent is:

1. Process for the oxidation of an alcohol comprising preheating a mixture comprising the alcohol and gas containing free oxygen and passing the heated alcohol vapor and gas through a reaction zone at a linear velocity of at least 25 feet per second.

2. Process for the oxidation of an alcohol comprising preheating a mixture comprising the alcohol and gas containing free oxygen and passing the heated alcohol vapor and gas through a reaction zone at a linear velocity of at least 25 feet per second while causing the reaction to take place at a temperature not exceeding 900° F.

3. Process for the oxidation of ethyl alcohol comprising preheating a mixture of ethyl alcohol and air and passing the heated alcohol vapor and gas through a reaction zone at a linear velocity of 25 to 200 feet per second.

4. Process for the oxidation of ethyl alcohol comprising preheating a mixture of ethyl alcohol and air and passing the heated alcohol vapor and gas through a reaction zone at a linear velocity of 25 to 200 feet per second while causing the reaction to take place at a temperature of 750° to 825° F.

5. Process for the oxidation of an alcohol comprising passing a preheated mixture of the alcohol vapor, gas containing oxygen and diluent gas through a reaction zone at a linear velocity of at least 25 feet per second, condensing condensible products from the resulting products and recycling part of the uncondensed gas to the reaction.

6. Process for the oxidation of ethyl alcohol comprising passing a preheated mixture of ethyl alcohol vapor, air and excess nitrogen through a reaction zone at a linear velocity of at least 25 feet per second.

7. Process for the oxidation of ethyl alcohol comprising passing a preheated mixture of ethyl alcohol, vapor, air and excess nitrogen through a reaction zone at a linear velocity of at least 25 feet per second, condensing condensible products from the resulting products and recycling part of the uncondensed gas to the reaction.

8. Process for the oxidation of ethyl alcohol comprising passing a mixture of ehyl alcohol vapor, air and excess nitrogen preheated to a temperature of 240° to 450° F. through a reaction zone at a linear velocity of at least 25 feet per second.

9. Process for the oxidation of ethyl alcohol comprising passing a preheated mixture of ethyl alcohol vapor, air and excess nitrogen through a reaction zone at a linear velocity of at least 25 feet per second while causing the reaction to take place at a temperature not exceeding 900° F.

10. Process for the oxidation of ethyl alcohol comprising passing a mixture of ethyl alcohol vapor, air and excess nitrogen preheated to a temperature of 240° to 450° F. through a reaction zone at a linear velocity of at least 25 feet per second while causing the reaction to take place at a temperature of 750° to 825° F.

11. Process for the oxidation of ethyl alcohol comprising passing a preheated mixture of ethyl alcohol vapor, air and excess nitrogen through a reaction zone at a linear velocity of at least 25 feet per second while causing the reaction to take place at a temperature not exceeding 900° F., condensing condensible products from the resulting products and recycling part of the uncondensed gas to the reaction.

12. Process for the oxidation of ethyl alcohol comprising passing a mixture of ethyl alcohol vapor, air and excess nitrogen preheated to a temperature of 240° to 450° F. through a reaction zone at a linear velocity of at least 25 feet per second while causing the reaction to take place at a temperature of 750° to 825° F., condensing condensible products from the resulting products and recycling part of the uncondensed gas to the reaction.

13. Process for the oxidation of an alcohol comprising causing the vapor of the alcohol to react with a gas containing free oxygen at elevated temperatures under such conditions that the reactants are exposed to reaction temperatures for from $\frac{1}{20}$ to $\frac{3}{4}$ second.

14. Process for the oxidation of ethyl alcohol comprising causing ethyl alcohol vapor to react with air at elevated temperatures under such conditions that the reactants are exposed to reaction temperatures of from $\frac{1}{20}$ to $\frac{3}{4}$ second.

15. Process for the oxidation of ethyl alcohol comprising causing ethyl alcohol vapor to react with air at elevated temperatures under such conditions that the reactants are exposed to reaction temperatures of from $\frac{1}{20}$ to $\frac{3}{4}$ second, the reaction mixture being caused to pass through the reaction zone at a linear velocity of at least 25 feet per second.

JOSEPH E. BLUDWORTH.